(12) United States Patent
Nohda

(10) Patent No.: US 6,215,875 B1
(45) Date of Patent: Apr. 10, 2001

(54) CIPHER PROCESSING SYSTEM

(75) Inventor: Shigetoshi Nohda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/005,946

(22) Filed: Jan. 12, 1998

(30) Foreign Application Priority Data

Jan. 21, 1997 (JP) .................................................. 9-008572

(51) Int. Cl.[7] .................................................. H04N 7/167
(52) U.S. Cl. .......................... 380/202; 380/210; 380/209; 380/259; 326/8
(58) Field of Search .............................. 326/8; 380/9, 20, 380/3

(56) References Cited

U.S. PATENT DOCUMENTS

| | | | |
|---|---|---|---|
| 5,440,632 | * 8/1995 | Bacon et al. | 380/20 |
| 5,768,372 | * 6/1998 | Sung et al. | 380/3 |
| 6,061,451 | * 5/2000 | Muratani et al. | 380/201 |

* cited by examiner

Primary Examiner—Thomas R. Peeso
Assistant Examiner—Todd Jack
(74) Attorney, Agent, or Firm—Frommer Lawrence & Haug, LLP.; William S. Frommer; Bruno Polito

(57) ABSTRACT

A cipher processing apparatus which readily updates a cipher processing circuit for encrypting information communicated through a communication function. A service station side and a user side are connected. A receiving function receives a command for requesting a change of a cipher processing program and the cipher processing program which are transmitted from the service station side to the user side through the communication function. Circuit updating function updates a cipher processing circuit provided on the user side with the cipher processing program. With these functions, the cipher processing circuit provided on the user side can be readily rewritten in accordance with the cipher processing program transmitted from the service station side.

15 Claims, 7 Drawing Sheets

CIPHER PROCESSING SYSTEM

BACKGROUND OF THE INVENTION

1. Field of the Invention

The present invention relates to a cipher processing system and is particularly applicable to a cipher processing system for encrypting or decrypting information communicated between a service station and a user side connected thereto.

2. Description of the Related Art

In recent years, a variety of broadcasting routes are provided such as ground broadcasting, satellite broadcasting, cable television (CATV), Internet broadcasting, and a bidirectional service is also available through a communication network such as Internet or the like. With increasingly spreading multimedia environments, a variety of information has been mixed in broadcast information such as audio data, video data, textual and graphical data, and code. In such a situation, for example, when information is communicated between a service station and a user through a communication line, a variety of security functions are also increasingly required, for example, for limited accesses only for contracted users, electronic authentication, electronic money, protection of privacy, and so on.

The encryption for ensuring the security has also been implemented by a variety of approaches depending on associated information. For example, relatively simple processing such as line shuffle and so on is employed for video information, while security key cryptography such as Data Encryption Standard (DES) cipher, Fast Data Encipherment Algorithm (FEAL) cipher, are employed for long sentences and long code information. Public key cryptography such as Rivest Shamir Adelman (RSA) cipher or the like, for example, may be employed for electronic authentication.

It seems that the cipher processing is being rapidly developed, and a variety of improvements and new processing formulae are being proposed and brought into practical use in attempt of providing ever stronger encryption.

Cipher processing by a DES method is typical of the above-mentioned encryption methods. As is well known, the basic structure of this cipher processing involves randomization of information realized in a structure in which an involution structure is preserved. Deeply related to the encryption strength in this structure is a function-coupling type non-linear substitution portion. In DES64, this is included in a non-linear substitution table function called "S-box," in which an output exhibits a non-linear change from 1 to 4 [bits] for a 1 [bit] change in an input, and this change ends up with a final 37 [bits] change in a multi-stage (15 stages in DES64) structure, which is highly randomly mixed to provide significantly strong cipher processing. As such, there has not been found any decryption method for this cipher, other than a one-by-one attack.

In a one-by-one decryption method, DES64 requires $2^{55}$ calculations, and it takes approximately 1000 years for a computer having a capability of processing one calculation in 1 [$\mu$sec] to complete such a large number of calculations for the decryption.

However, with the recent supercomputers and parallel processing technologies, there is a fear that decryption capabilities have been enhanced so rapidly that DES64 would be decrypted in a short time in the near future. Thus, improvements have been proposed to enhancing the strength against decryption, such as an increase in bit number. It is a general tendency that a variety of encryption enhancing approaches will also be proposed and improved from now on. The security key cryptography includes a variety of unique schemes such as FEAL other than DES. The RSA cipher belonging to the public key cryptography largely differs from DES in processing form, and employs residual equations for calculations as follows: $C \equiv M^e$ mod n for encryption and $M \equiv C^d$ mod n for decryption, where M is an input sentence, e and n are public keys, and d is a security key.

While a fast exponential calculation method (calculations of 21 ne times) and so on are known for exponential calculation, an implementation using hardware such as digital signal processor (DSP) is essential because the load of the repetitive calculation is heavy and takes a long processing time. Conventionally, it was a general tendency to propose fixed hardware for each of schemes involving largely different processing in accordance with their differences. However, such a fixed processing scheme implies problems in that a unique encryption processor must be provided for each of a plurality of different services, and that this scheme cannot support feature up-grading.

As explained above, the encryption enhancement largely depends on the non-linear processing for function coupling. A large difference between DES and FEAL schemes lies in this function coupling portion, and the most important processing is to achieve a non-linear and reliable random substitution. For this processing, several configurations have been proposed in response to up-to-date requirements. In addition, since the cipher processing is performed in blocks (for example, in a unit of a 64-bit block comprising 56 [bits] of data and 8 [bits] of parity), the number of bits directly relates to the encryption strength, so that the selection of a number of bits, corresponding to up-to-date requirements, is important. These must be continually provided to users as up-versions to maintain the encryption strength and ensure the reliability of the cipher processing. Furthermore, other than these security key approaches principally adapted to transfer a large amount of data, public key approaches using the RAS encryption are applied to, for example, authentication and security key delivery, and methods having completely different encryption structures also exist. Conventionally, however, for up-grading the hardware for an encryption circuit in order to arbitrarily cope with a variety of unique methods and to take countermeasures to decryption of an encryption approach, there has been no effective approach other than exchanging or newly purchasing associated hardware.

SUMMARY OF THE INVENTION

In view of the foregoing, an object of the present invention is to provide a cipher processing system for encrypting and decrypting information communicated with a communication function which is readily updated.

The foregoing object and other objects of the invention have been achieved by the provision of a cipher processing apparatus which readily updates a cipher processing circuit for encrypting information communicated through a communication function. In this apparatus, a service station side and a user side are connected. A receiving function receives a command for requesting a change of a cipher processing program and the cipher processing program which are transmitted from the service station side to the user side through the communication function. Circuit updating function updates a cipher processing circuit provided on the user side with the cipher processing program. With these functions, the cipher processing circuit provided on the user side can be readily rewritten in accordance with the cipher processing program transmitted from the service station side.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 1:
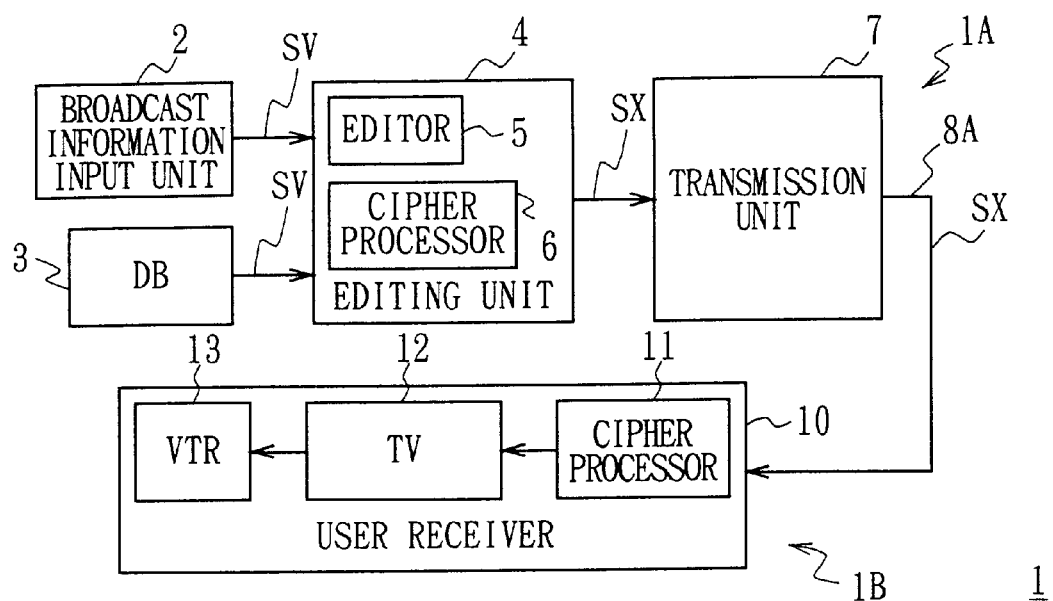
FIG. 1 is a block diagram showing the general configuration of a cipher processing apparatus according to a first embodiment.

Preferred embodiments of the present invention will be described with reference to the accompanying drawings:

In FIG. 1, a cipher processing apparatus, generally designated by 1, inputs material data SV comprising video materials imaged by a camera (not shown), video/audio materials from a video tape recorder (VTR) which is not shown, and so on, created in a service station side 1A for providing users with materials, to an editing unit 4 through a broadcast information input unit 2 and a database (DB) 3. The editing unit 4, upon receiving the material data SV, edits the material data SV with an editor 5 including a VTR, a telopper, a computer, and so on, and converts the edited data into encrypted data SX with a cipher processor 6.

The encrypted data SX thus produced in the editing unit 4 is transmitted from the transmission unit 7 equipped with facilities such as ground broadcasting and satellite broadcasting to a user receiver 10 installed on a user side 1B through a communication network 8A.

The user receiver 10 decrypts the received encrypted data SX with a cipher processor 11, and displays the material data SV decoded from the encrypted data SX on a television receiver (TV) 12. The decoded material data SV may also be recorded and/or reproduced by a VTR 13.

Figure 2:
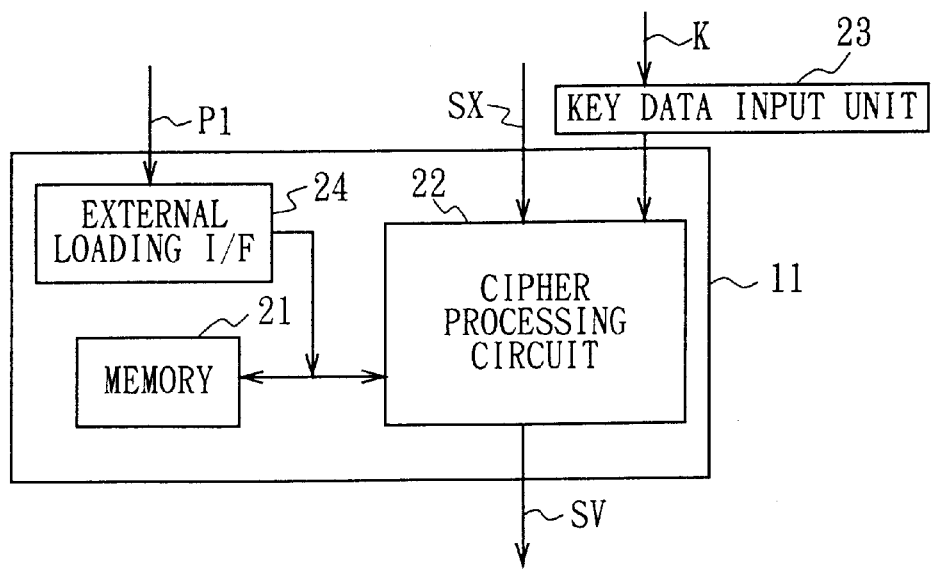
FIG. 2 is a block diagram showing the configuration of a cipher processor according to the first embodiment.

The cipher processor 11, as shown in FIG. 2, reads an existing cipher processing program, previously provided in a memory 21, and loads a cipher processing circuit 22 with the read program, upon receiving the encrypted data SX, when the encrypted data SX corresponds to an existing cipher processing program.

The cipher processing circuit 22 is formed, for example, of a digital signal processing circuit of a field programmable gate array (FPGA) scheme composed of an electrically erasable programmable ROM (EEPROM) or the like, and arbitrary sets a cipher processing algorithm in accordance with a cipher processing program loaded thereto such that wiring of gate arrays constituting the cipher processing circuit 22 can be modified.

When the cipher processing circuit 22 is loaded with a cipher processing program, the cipher processing is executed in response to key data K inputted through a key data input unit 23, in accordance with the key data K. During the cipher processing, a predetermined region in the memory 21 is used as a table (LUT: look up table) for code conversion processing which is executed in cipher processing steps.

On the other hand, when a new cipher processing program P1, in accordance with the encryption data SX but requiring non-existing cipher processing, is to be transmitted from the service station side 1A to the user side 1B through the communication network 8A, the user receiver 10 is capable of acquiring the new cipher processing program P1 through an external loading I/F 24.

The material data SV decoded in the cipher processing circuit 22 is sent to the TV 12.

Here, the key data K for cipher processing corresponding to the cipher processing program P1 is transmitted from the service station side 1A to the user receiver 1B through the communication network 8A.

Figure 3:
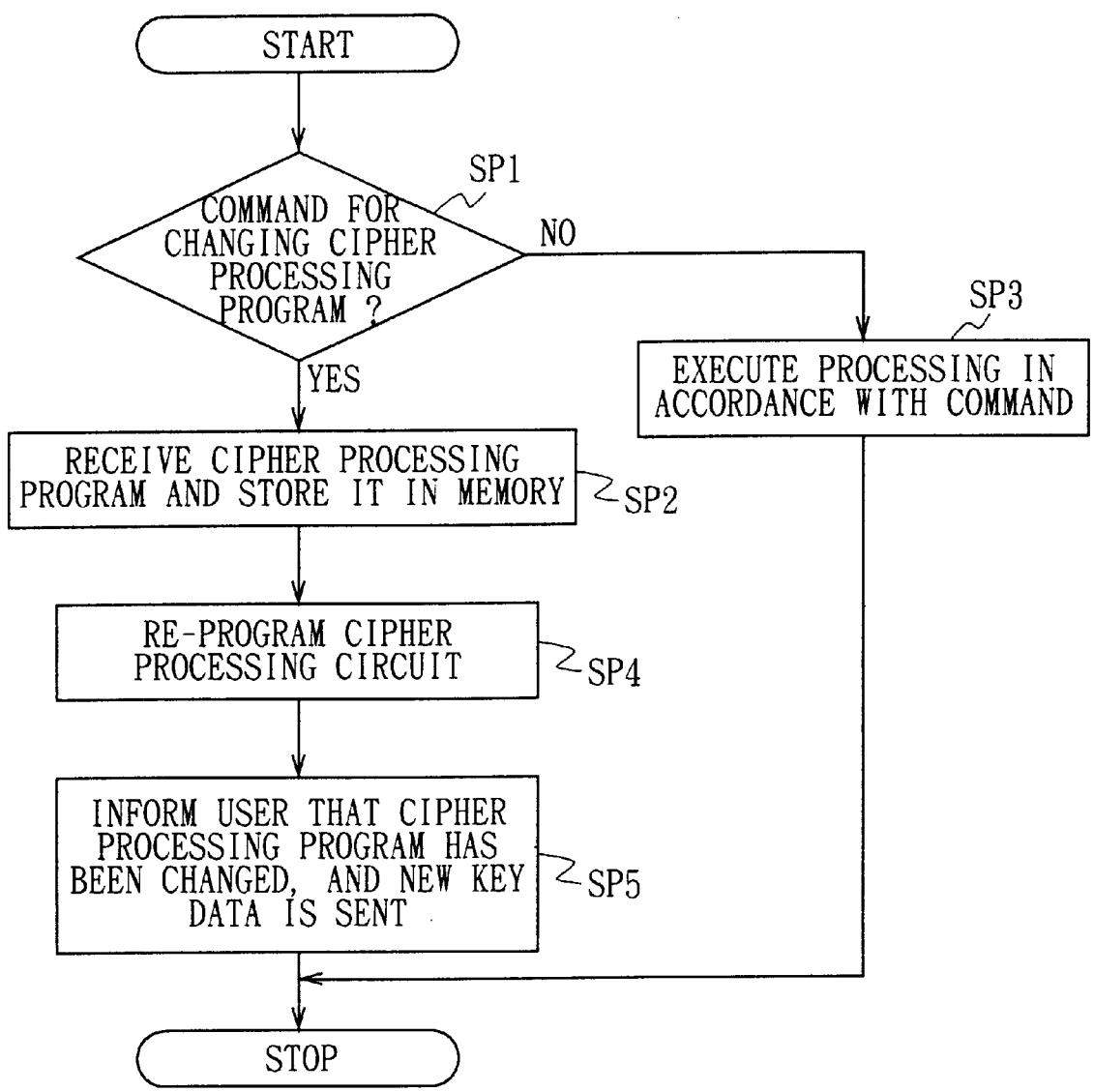
FIG. 3 is a flow chart showing a cipher processing procedure.

An actual processing for the cipher processing circuit with a cipher processing program is executed along a cipher processing procedure as shown in FIG. 3. More specifically, the user receiver 10, when receiving a transmission command from the service station side 1A, determines at step SP1 whether or not the command is to instruct a change of the cipher processing program. When the command instructs a change of the cipher processing program, the procedure moves to step SP2 where a cipher processing program P1 is received through the external loading I/F 24 and stored in the memory 21 (FIG. 2). On the contrary, when the command is not to instruct a change of the cipher processing program, the procedure moves to step SP3 where appropriate processing is executed in accordance with the received command and stopping this sequence.

At step SP4 subsequent to step SP2, the cipher processing circuit 22 is re-programmed with the cipher processing program P1 stored in the memory 21.

At subsequent step SP5, the user receiver 10 informs the user, with a display such as a message on the screen of the TV 12, that the key data K corresponding to the cipher processing program P1, with which the cipher processing circuit 22 has newly been programmed, is transmitted from the service station side 1A to the user side 1B through the communication network 8A, thus stopping the cipher processing procedure.

Figure 4:
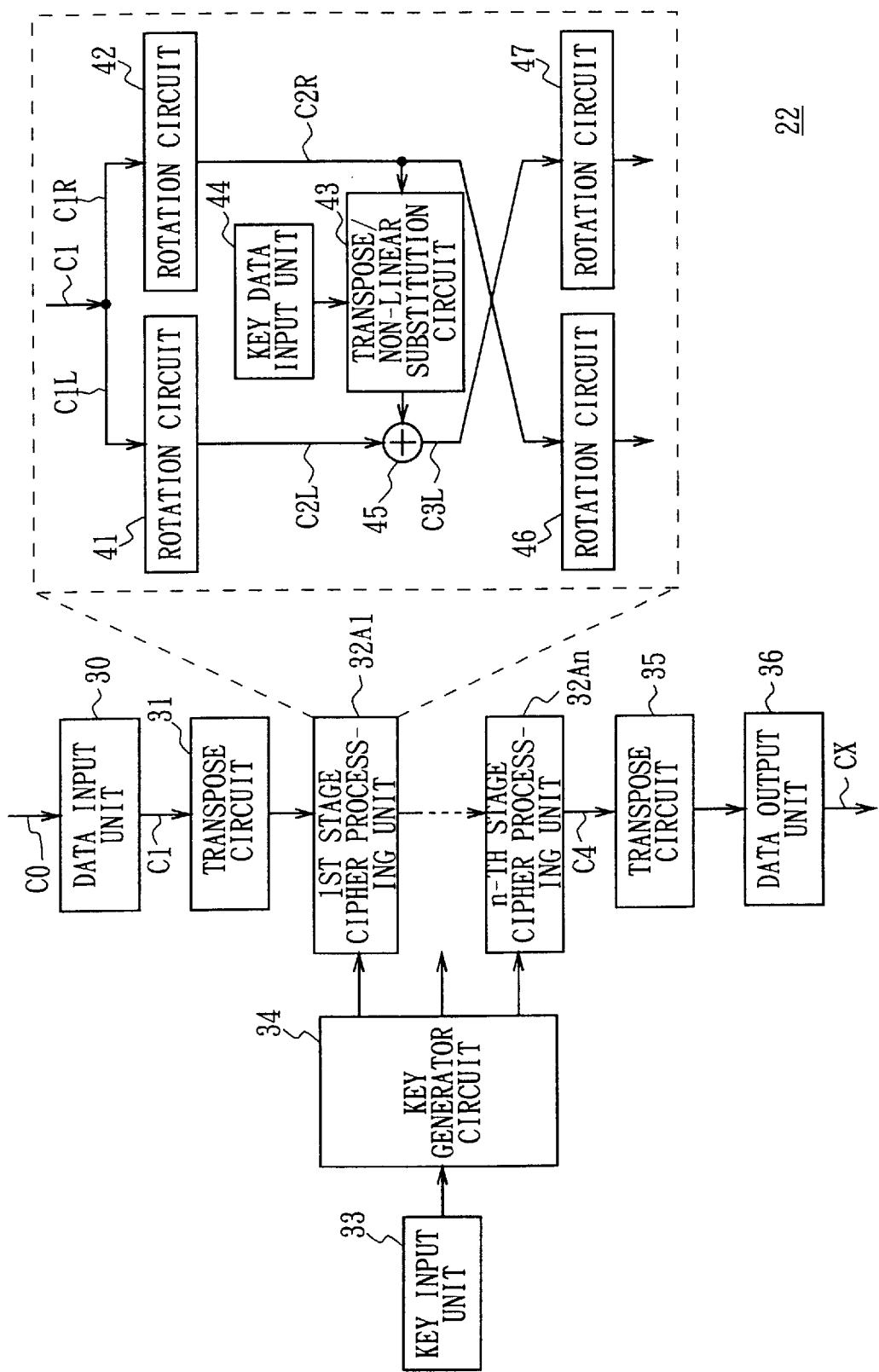
FIG. 4 is a block diagram showing the configuration of a cipher processing circuit.

FIG. 4 shows an example of the cipher processing circuit 22 using the DES approach. The cipher processing circuit 22, when receiving normal sentence input data C0 having, for example, a total of 64 bits (56 bits of which are character data, and 8 bits of which are parity data), as material data from a data input unit 30, replaces the input data C0 with transposed data C1 through an initial transpose P by a transpose circuit 31 using a correspondence table, and branches the transposed data C1 and sends the branched transposed data C1 to a first stage cipher processing circuit 32A1.

In the first stage cipher processing circuit 32A1, data C1L and C1R, equally branched into 32 bits from the 64-bit transposed data C1, are sent to rotation circuits 41 and 42, respectively.

Figure 5A:
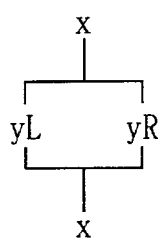
FIGS. 5A to 5G are schematic diagrams illustrating the involution structure.

In this event, as shown in FIG. 5A, input data x is branched into data yL and yR by the branching operation. The branched data yL and yR are returned to be the data x by a branching operation. That is, the branch structure forms an involution structure.

The rotation circuits 41 and 42 replace least significant bits (LSB) with most significant bits (MSB) by rotation manipulations for the 32-bit data C1L and C1R, respectively, to output data C2L and C2R.

Figure 5B:
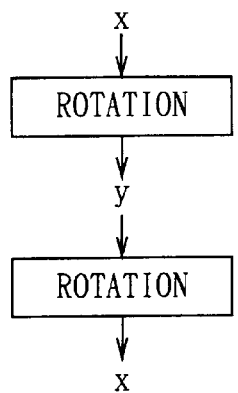

In this event, as shown in FIG. 5B, when the input data x is translated into data y by rotation, the initial input data x can be derived by again performing the rotation manipulation on the data y. That is, the rotation manipulation forms an involution structure.

Figure 5C:
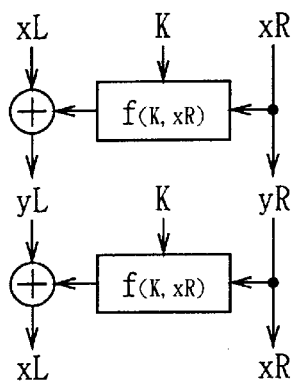
Figure 5D:
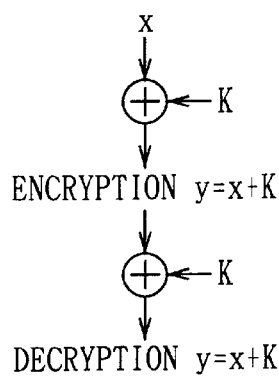

Next, in a transpose/non-linear substitution circuit 43, after a function coupling is performed on one of the data C2L through transpose and non-linear substitution as shown in FIG. 5C, using predetermined key data K inputted through a key data input unit 44, an exclusive OR is taken with the other data C2R in an exclusive-OR circuit 45 as shown in FIG. 5D, and the resulting data C3L is sent to a rotation circuit 47. Here, the rotation circuit 47 performs a rotation manipulation on the data C3L.

Figure 5E:
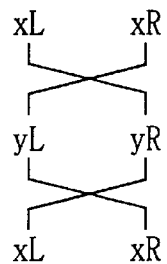
Figure 5F:
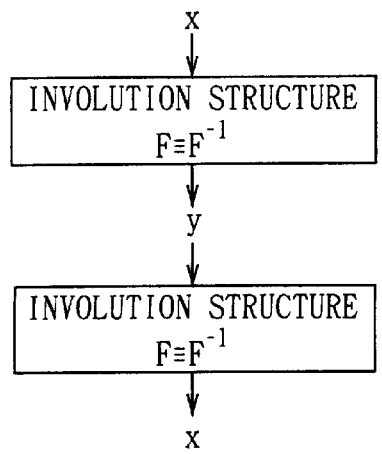

The data C2R, on the other hand, is sent as it is to the rotation circuit 46, where a rotation manipulation is performed thereon. In this way, the data C2R and C3L are subjected to an exchange manipulation as shown in FIG. 5E and the rotation manipulations as shown in FIG. 5B.

Similar cipher processing to the cipher processing executed in the first stage cipher processing circuit 32A1 is repeatedly executed in cipher processing circuits 32An at subsequent stages up to the n-th stage.

When the cipher processing is completed at the n-th stage cipher processing circuit 32An, the branched data are coupled and sent to the transpose circuit 35.

The transpose circuit 35 performs a final transpose $P^{-1}$ on the data C4 for the transpose P by the transpose circuit 31, and then output eventually encrypted data CX from a data output unit 36.

According to the encryption performed by the cipher processing circuit 22 having the involution structure, the encryption and decryption can be executed by the same cipher processing circuit.

The key data K used for the respective transpose/non-linear substitution circuits 43 in the fist stage cipher processing circuit 32A1 to the n-th stage cipher processing circuit 32An is inputted through the key input unit 33, and different key data K is generated in the key generator circuit 34 for each of the n-th stage cipher processing circuits 32An and sent to the corresponding cipher processing circuit.

In the foregoing configuration, the material data SV edited in the editing unit 4 of the service station side 1A is encrypted into the encrypted data SX by the cipher processor 6, and transmitted from the transmission unit 7 to the user receiver 10 installed in the user side 1B through the communication network 8A.

The user receiver 10, upon receiving the encrypted data SX, decrypts the encrypted data SX by the cipher processor 11, and displays the decoded material data SV on the TV 12. The decoded material data SV may further be recorded and/or reproduced by the VTR 13.

Here, when the cipher processing program for the cipher processor 11 is to be changed, the user receiver 10 on the user side 1B, upon receiving a command from the service station side 1A, determines whether or not the received command is to instruct a change of the cipher processing program. If the received command is to instruct a change of the cipher processing program, the cipher processing program P1 is stored in the memory 21 through the external loading I/F 24 (FIG. 2). As a result, the cipher processing circuit 22 of FPGA scheme is re-programmed by the cipher processing program P1 stored in the memory 21. In this way, the cipher processing circuit 22 can be changed to any arbitrary cipher processing circuit by the cipher processing program P1 transmitted from the service station side 1A. when the cipher processing circuit 22 of the user receiver 10 is re-programmed, the user receiver 10 informs the user, with a display such as a message on the screen of the TV 12, that key data K corresponding the cipher processing program P1 is sent to the user side 1B.

When an update of the cipher processing program for the cipher processing circuit 22 is completed in the cipher processor 11, the user can decrypt encrypted data SX transmitted from the service station side 1A to material data SV with the updated latest cipher processing program. Consequently, the user side 1B can decode the material data SV included in the encrypted data SX sent from the service station side 1A with the cipher processing circuit 22 created by the latest cipher processing program which can be readily updated.

According to the foregoing configuration, since the user receiver 10 re-programs the cipher processing circuit 22 of FPGA scheme in the cipher processor 11 with a cipher processing program P1 transmitted from the service station side 1A in response to a command transmitted from the service station side 1A to instruct a change of a cipher processing program, the cipher processing circuit 22 in the cipher processor 11 can be readily modified to the latest cipher processing circuit 22 in accordance with a variety of specifications inherent to each user with the cipher processing program P1 transmitted from the service station side 1A, thereby making it possible to enhance the encryption capability by arbitrarily updating the contents of the cipher processing circuit which could be decrypted with higher possibility as improvement of the art and to reliably protect the security of transmitted material data SV.

Also, since the cipher processing circuit 22 of FPGA scheme is modified with the cipher processing program P1 in software, a variety of cipher processing implemented by the cipher processing program P1 may be executed in the cipher processing circuit 22 as hardware processing.

By modifying the cipher processing circuit 22 with the cipher processing program P1 in software, the hardware of the cipher processing circuit 22 can be largely reduced.

The foregoing first embodiment has dealt with the case where the satellite broadcasting or the communication network 8A of the ground broadcasting is employed to transmit the cipher processing program P1 from the service station side 1A to the user side 1B. However, the present invention is not only limited to this but also an Internet line, for example, may be used. This enables encrypted information to be transmitted also from the user side 1B to the service station side 1A.

Figure 5G:
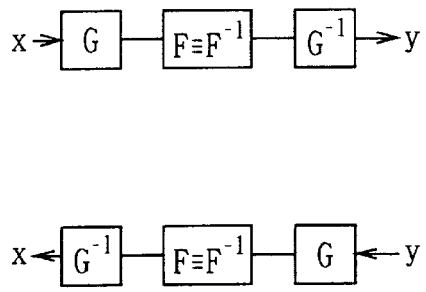

The foregoing first embodiment has dealt with the case where a branch structure, rotation, and exchange structure, are employed as the involution structure used in the cipher processing circuit. However, the present invention is not only limited to them but also the involution structure may be realized when a structure with mutually inverse functions placed on both sides thereof is formed as shown in FIG. 5G. With this structure, the decryption can be performed by the same processing as the encryption.

Figure 6A:
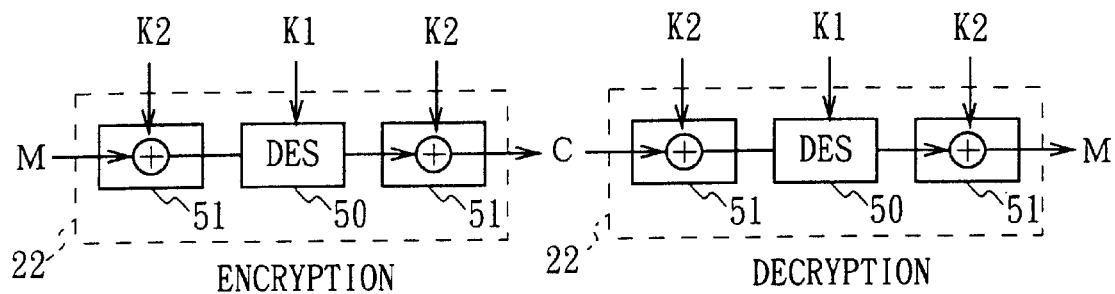
FIGS. 6A to 6C are block diagrams illustrating the cipher processing circuit.

In the foregoing first embodiment, as shown in FIG. 6A, the cipher processing circuit 22 may be composed of a strong cipher processing circuit 50 such as, for example, DES and weak cipher processing circuits 51 (for example, exclusive-OR circuits), disposed before and after the cipher processing circuit 50, which have set key data K2 different from key data K1 assigned to the cipher processing circuit 50. In this structure, assuming that an effective number of bits for the block encryption processing is m+1, it is known that the number of times the decryption is attempted on a one-by-one attack amounts to $2^m$, so that the decryption is impossible unless the key data K1 and K2 are simultaneously known. The number of times the one-by-one attack must be done for the two different key data K1 and K2 amounts to $2^{2m}$. Assume that the number of bits of input data is, for example, 56 bits, and that 1,000 computers, each capable of processing one decryption in 1 [μm], process the decryption in parallel. Although the strong cipher processing circuit alone can be decrypted in about one year, a simple structure including the additional weak cipher processing circuits 51 before and after the strong cipher processing circuit 50 can set a cipher so strong that decryption therefore would require approximately $10^{17}$ years, whereby the decryption is made virtually impossible.

Figure 6B:
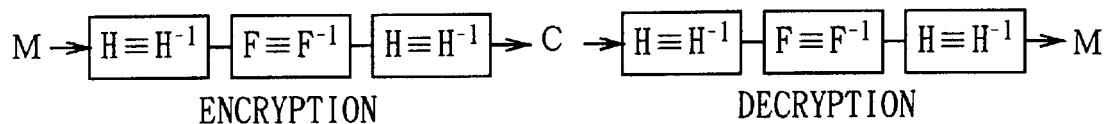
Figure 6C:
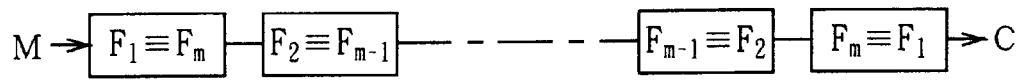

The structure for the cipher processing circuit 22 may be such that, as shown in FIG. 6B, lower strength cipher processing circuits H are connected before and after a higher strength cipher processing circuit F in a sandwich manner. The number of stages of serial connections with the lower strength cipher processing circuits H can be increased up to substantially $2^m$ at maximum, as shown in FIG. 6C. In this way, the cipher processing strength of the cipher processing circuit can be increased in accordance with the number of connected stages.

Furthermore, the foregoing embodiment has dealt with the case where the key data K for cipher processing is transmitted from the service station side 1A to the user side 1B through the communication network 8A. The present invention, however, is not only limited to this but also the key data K may be separately sent, for example, as a registered mail by post. In this way, the security for the key data K can be maintained, and the cipher processing program P1 can be prevented from being decrypted with information on the key data K which may have been stolen through illegal invasion into the communication network 8A.

Figure 7:
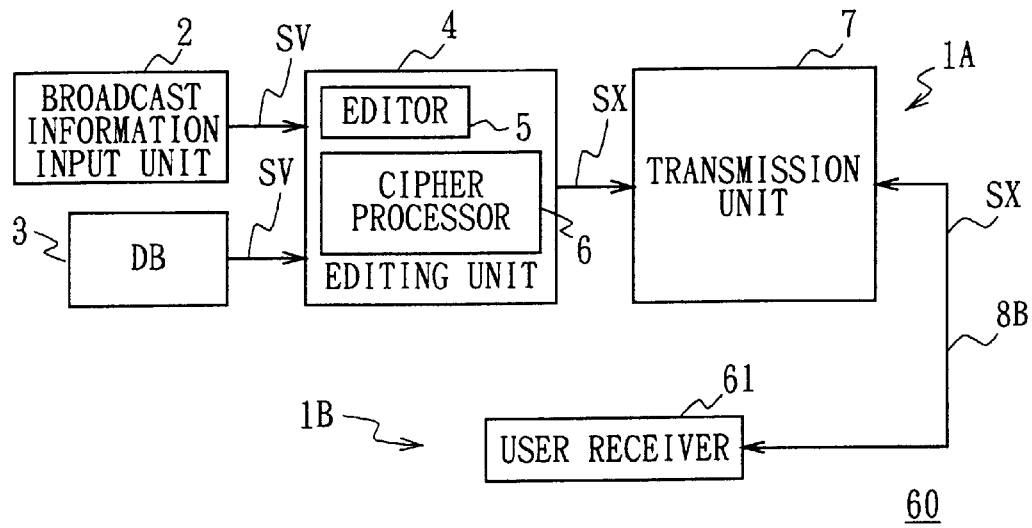
FIG. 7 is a block diagram showing the general configuration of a cipher processing apparatus according to a second embodiment.

In FIG. 7 in which parts corresponding to those in FIG. 1 are designated by the same reference numeral, a cipher processing apparatus according to the second embodiment, designated by 60, has the same configuration as the first embodiment except that a user receiver 61 is provided with a personal computer.

Figure 8:
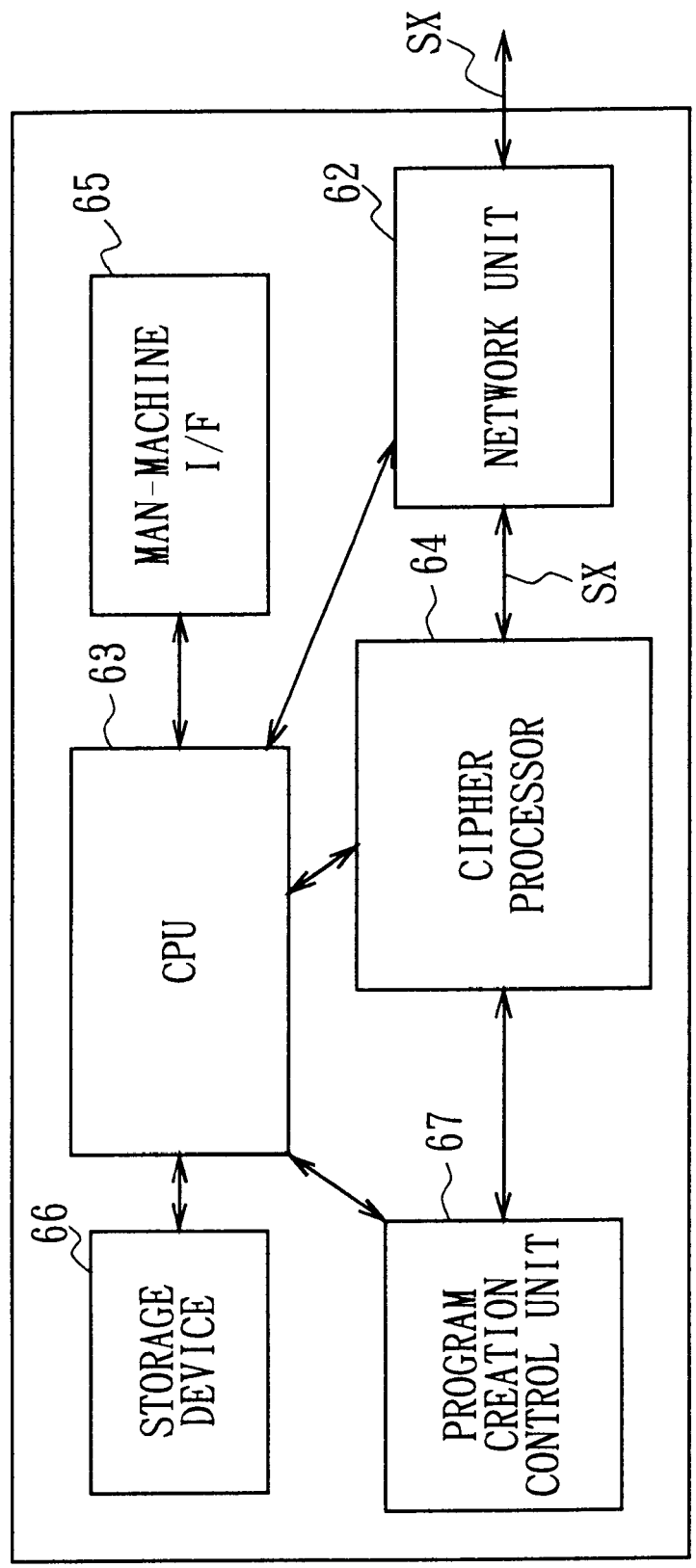
FIG. 8 is a block diagram showing the configuration of a user receiver according to the second embodiment.

As shown in FIG. 8, the user receiver 61, upon receiving encrypted data SX transmitted from a service station side 1A by a network unit 62 through Internet BB connected by way of a telephone line, decrypts the encrypted data SX in a cipher processor 64 under the control of a central processing unit (CPU) 63.

Material data SV decoded from the encrypted data SX in the cipher processor 64 is stored in a storage device 66 such as DVD under the control of CPU 63 by the user manipulating a man-machine interface (man-machine I/F) 65 having input and output devices such as a mouse, a keyboard, and a monitor (not shown). The stored material data SV can be read from the storage device 66 by randomly accessing the storage device 66.

A cipher processing circuit within the cipher processor 64 is formed on an extended board within the personal computer as a digital signal processing circuit of FPGA scheme, such that an encryption program stored in a memory within a program creation control unit 67 can be loaded into the cipher processing circuit 22 on the extended board through an internal bus of the CPU 63 under the control of the program creation control unit 67 by the user manipulating the man-machine I/F 65, whereby circuit connections in the cipher processing circuit 22 can be modified in accordance with the encryption program.

Figure 9:
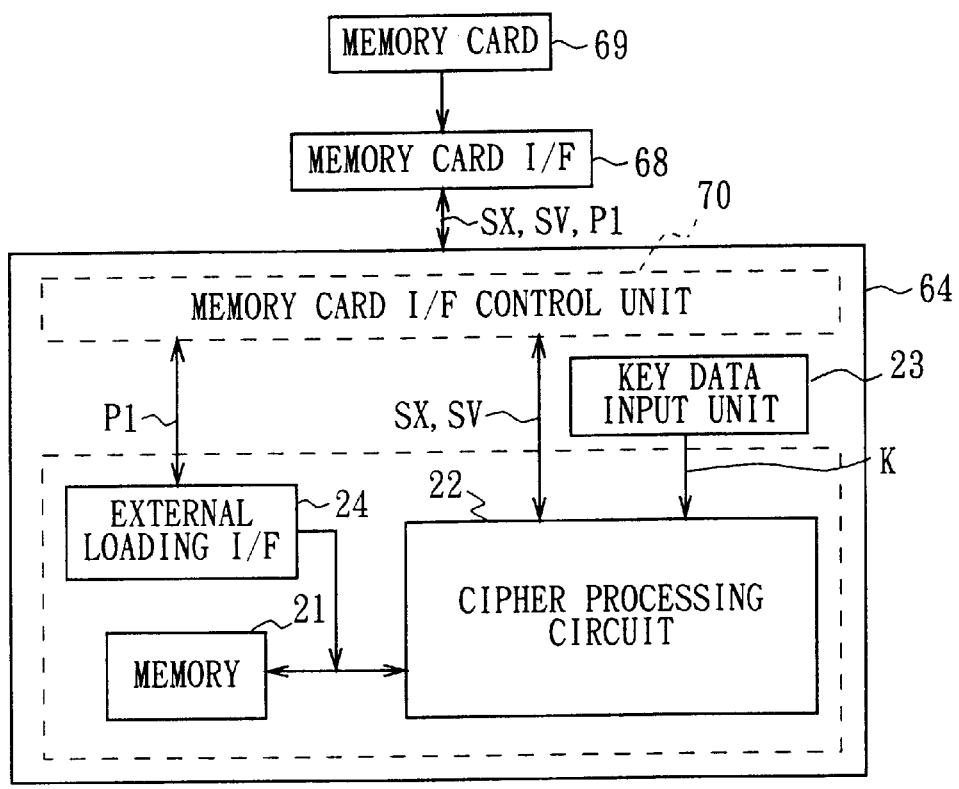
FIG. 9 is a block diagram showing the configuration of a cipher processor according to the second embodiment.

Also, in FIG. 9 in which parts corresponding to those in FIG. 2 are designated by the same reference numerals, a cipher processor 64 is configured to load a cipher processing circuit 22 with encrypted data SX and a cipher processing program P1 stored in a memory card 69 through an external loading I/F 24 and through a memory card I/F control unit 70 by setting the memory card 69 in a memory card interface (memory card I/F) 68.

In the foregoing configuration, the user receiver 61, upon receiving encrypted data SX transmitted from the service station side 1A at the network unit 62, decrypts the encrypted data SX in the cipher processor 64 under the control of the CPU 63.

The cipher processing circuit 22 within the cipher processor 64 is formed of a digital signal processing circuit of FPGA scheme, and can freely modify gate array wiring in the cipher processing circuit 22 under the control of the program creation control unit 67 by the software for creating an encryption program stored in a memory within the program creation control unit 67.

Also, the user receiver 61, upon receiving a command transmitted from the service station side 1A by the network unit 62, determines by the CPU 63 whether or not the received command is to change the cipher processing program. When the received command is to change the cipher processing program, the user receiver 61 receives a cipher processing program P1 through the internet 8B, and fetches the cipher processing program P1 into the cipher processing circuit 22 through the external loading I/F 24. In this way, the contents of the cipher processing circuit 22 can be modified by the cipher processing program P1.

The user receiver 61, upon receiving the cipher processing program P1 from the service station side 1A, informs the user that the cipher processing program has been updated and new key data K is transmitted, through a monitor (not shown) of the personal computer or the like.

The user, upon confirming the reception of the key data K, can transmits the acknowledgement of the reception from the user side 1B to the service station side 1A through the Internet 8B.

In addition, encrypted information can be transmitted using the cipher processor 64 from the user side 1B to the service station side 1A through the Internet 8B.

The cipher processor 64 can also send the cipher processing program P1 to the cipher processing circuit 22 through the memory card I/F control unit 70 by setting the memory card 69 having the cipher processing program P1 stored therein in the memory card I/F 68 on the service station side 1A.

The cipher processor 64 can further fetch the encrypted data SX from the memory card 69 by setting the memory card 69 having the encrypted data SX stored therein in the memory card I/F 68 on the service station side 1A. In this way, it is possible to significantly improve the security when the cipher processing program P1 and the encrypted data SX are transmitted and received between the service station side 1A and the user side 1B.

The cipher processor 64 can further retrieve the key data K from the memory card 69 by setting the memory card 69 having the key data K for cipher processing stored therein in the memory card I/F 68 on the service station side 1A. In this way, it is possible to significantly improve the security when the key data K is transmitted and received between the service station side 1A and the user side 1B.

According to the foregoing configuration, since the user receiver 61 is provided with a personal computer, a cipher processing program transmitted from the service station side 1A to the user side 1B can be automatically received and fetched by the CPU 63, and similar effects to those of the aforementioned first embodiment can be provided.

Also, the cipher processing program P1, the encrypted data SX, and the key data K are fetched into the user receiver 61 by the memory card 69 through the memory card I/F 68, so that the security can be significantly improved when the cipher processing program P1, the encrypted data SX, and the key data K are transmitted and received.

Furthermore, since encrypted information data is transmitted and received to and from the service station side 1A through the Internet 8B, information can be bidirectionally exchanged while the security for the information data is ensured.

The foregoing embodiments have dealt with the case where the service station side 1A and the user side 1B are connected through ground broadcasting, satellite broadcasting, or telephone line. However, the present invention is not only limited to this but also may be connected through Integrated Services Digital Network (ISDN), cable television (CATV), transmission control protocol/Internet protocol (TCP/IP), or the like. This can produce similar effects to those of the foregoing embodiments. Furthermore, the ground broadcasting, satellite broadcasting or telephone line may be used in parallel with ISDN, CATV, or TCP/IP.

The foregoing embodiments have dealt with the case of encrypting character data. However, the present invention is not only limited to such data but also may be applied to encryption of image data using a shuffling approach or the like.

Furthermore, the foregoing embodiments have dealt with the case where the transmission of the key data K corresponding to the new cipher processing program P1 is informed from the service station side 1A to the user side 1B after the cipher processing circuit 22 has been updated. However, the present invention is not only limited to this but also a change of the cipher processing program may only be informed for a cipher processing circuit which does not need the key data K.

According to the present invention as described above, the service station side and the user side are connected such that a command for requesting a change of a cipher processing program sent from the service side to the user side is received, a cipher processing program is received on the user side in response to the command, and a cipher processing circuit provided on the user side is updated by the cipher processing program, thereby making it possible to realize a cipher processing apparatus capable of readily rewriting the cipher processing circuit provided on the user side in accordance with the cipher processing program transmitted from the service station side.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A cipher decrypting apparatus, comprising:
   receiving means for receiving encrypted information transmitted from a transmitter through communication means;
   decoding means for decoding the encrypted information received by said receiving means into original information; and
   updating means for automatically updating a decoding procedure by said decoding means in accordance with updated information including key data.

2. The cipher decrypting apparatus according to claim 1, wherein;
   said decoding means is formed of programmable gate array circuits of which wiring can be rewritten by programming.

3. The cipher decrypting apparatus according to claim 1, further including;
   updated information receiving means for receiving said updated information.

4. The cipher decrypting apparatus according to claim 1, further including;
   information means to inform a user that processing procedure is updated by said updating means.

5. The cipher decrypting apparatus according to claim 1, further including;
   an interface for removable memory card in which a cipher processing program has been stored, said cipher decrypting apparatus wherein;
   said updating means updates said processing procedure in accordance with a cipher processing program supplied from said memory card through said interface.

6. A cipher processing system, comprising:
   a transmitting device for transmitting encrypted information obtained by encrypting original information; and
   a receiving device for receiving the encrypted information transmitted from said transmitting device, said cipher processing system wherein;
   said receiving device comprising,
     receiving means for receiving the encrypted information transmitted from the transmitter through communication means,
     decoding means for decoding the encrypted information received by said receiving means into original information, and
     updating means for automatically updating a decoding procedure by said decoding means in accordance with updated information including key data.

7. The cipher processing system according to claim 6, wherein;
   said decoding means is formed of programmable gate array circuits of which wiring can be rewritten by programming.

8. The cipher processing system according to claim 6, wherein;
   said receiving device further includes updated information receiving means for receiving said updated information.

9. The cipher processing system according to claim 6, wherein;

said receiving device further includes information means to inform a user that said processing procedure is updated by said updating means.

10. The cipher processing system according to claim 6, wherein:

said receiving means further includes an interface for removable memory card in which a cipher processing program has been stored; and said updating means updates said processing procedure in accordance with a cipher processing program supplied from said memory card through said interface.

11. A cipher decrypting method, comprising the steps of:

receiving encrypted information transmitted from a transmitter through communication means;

decoding the encrypted information received by said receiving means into original information; and automatically updating a decoding procedure by said decoding means in accordance with updated information including key data.

12. The cipher decrypting method according to claim 11, wherein;

said decoding step is executed by means of programmable gate array circuits of which wiring can be rewritten by programming.

13. The cipher decrypting method according to claim 11, further including the step of;

receiving said updated information.

14. The cipher decrypting method according to claim 11, further including the step of;

informing a user that said processing procedure is updated.

15. The cipher decrypting method according to claim 11, wherein;

said updating step updates said processing procedure in accordance with a cipher processing program supplied from a removable memory card.

* * * * *